United States Patent [19]

Levin

[11] Patent Number: 5,236,470
[45] Date of Patent: * Aug. 17, 1993

[54] METHOD FOR THE GASIFICATION OF COAL AND OTHER CARBONACEOUS MATERIAL

[75] Inventor: George B. Levin, Pittsburgh, Pa.

[73] Assignee: Advanced Waste Treatment Technology, Inc., Chicago, Ill.

[ * ] Notice: The portion of the term of this patent subsequent to Mar. 31, 2009 has been disclaimed.

[21] Appl. No.: 791,006

[22] Filed: Nov. 12, 1991

Related U.S. Application Data

[63] Continuation-in-part of Ser. No. 333,092, Apr. 19, 1989, Pat. No. 5,100,638.

[51] Int. Cl.⁵ .............. C10J 3/00; F02G 5/02; F23G 5/00; C01B 3/32
[52] U.S. Cl. ............... 48/210; 48/197 R; 60/39.02; 110/203; 110/214; 110/346; 423/579
[58] Field of Search ........ 48/197 R, 210, 61; 60/39.02; 423/579; 110/203, 214, 346

[56] References Cited

U.S. PATENT DOCUMENTS

| | | | |
|---|---|---|---|
| 4,137,052 | 1/1979 | du Pont et al. | 48/89 |
| 4,177,120 | 12/1979 | Zenty | 204/157.1 R |
| 4,229,184 | 10/1980 | Gregg | 48/62 R |
| 4,265,868 | 5/1981 | Kamody | 48/210 |
| 4,303,415 | 12/1981 | Summers | 48/210 |
| 4,388,084 | 6/1983 | Okane et al. | 48/210 |
| 4,415,339 | 11/1983 | Aiman et al. | 48/62 R |
| 4,459,137 | 7/1984 | Tanoue et al. | 48/210 |
| 4,464,183 | 8/1984 | Arisaki | 48/210 |
| 4,848,249 | 7/1989 | LePori et al. | 48/197 R |
| 5,100,638 | 3/1992 | Levin | 423/449 |

Primary Examiner—James C. Housel
Assistant Examiner—Rachel Freed
Attorney, Agent, or Firm—McAndrews, Held & Malloy, Ltd.

[57] ABSTRACT

A method for converting solid organic fuels, most particularly coals, into high temperature gases that can easily be transformed into useful energy. This method employs a substantially closed reactor, referred to as a gasifier, having an internal reaction chamber or cavity made of materials that can tolerate the presence of oxygen at high temperatures, that possess low thermal mass, that limit or restrict the passage of heat, that function as almost perfect black bodies at high temperatures, and that are resistant to the abrasive effects of the solid fuels.

14 Claims, 2 Drawing Sheets

METHOD FOR THE GASIFICATION OF COAL AND OTHER CARBONACEOUS MATERIAL

CROSS-REFERENCE TO RELATED APPLICATION

This application is a continuation-in-part of co-pending application Ser. No. 07/333,092 filed Apr. 19, 1989 now U.S. Pat. No. 5,100,638.

BACKGROUND OF THE INVENTION

The present invention relates to a method for converting, on an economically feasible basis, coals and other solid organic materials, such as organic waste or biomass, into a gas having an equivalent energy content suitable for use as a fuel for boilers and other energy conversion systems. More particularly, the present invention is directed to an improved method for converting, without the need for a large-scale, mechanically complex apparatus, solid fossil fuels and other organic materials to a relatively low-Btu gas which may then be economically burned on a relatively small scale to produce usable energy. The solid fossil fuels may be anthracite or other coals, or peat. In addition, other materials with a high organic component such as biomass, plant wastes, paper, and plastics can be used as feed for the gasifier. These other materials can be used as a feed either alone or in some combination with coal.

The conversion of solid organic materials into a suitable fuel gas is accomplished by exposing the solid organic materials to an intense field of radiation in an environment comprising an appropriate mixture of oxygen, and water. The fuel gas that results is a mixture of carbon monoxide, hydrogen, and small quantities of other gases such as carbon dioxide, with the amount of each product determined by the temperature of the reactor and the proportion of nitrogen, oxygen, and water in the initial reactor environment.

The fuel gas produced by the method of the present invention will have a relatively low energy value when compared to natural gas and other heating gases. However, the fuel gas can be utilized without further processing in a boiler, a gas turbine, or other energy conversion device, to produce useful energy, if the device is appropriately designed for such a low-energy fuel gas. The total equivalent energy value of the fuel gas will be between 180 to 220 Btu per cubic foot if air (approximately 20% oxygen and approximately 80% nitrogen) is supplied to the reactor, and may be as high as 350 Btu per cubic foot if 100% oxygen is supplied to the reactor. Mixtures of oxygen and nitrogen of intermediate proportions will produce fuel gases with intermediate energy values. In comparison, natural gas has an energy content of approximately 950 Btu per cubic foot.

The need to both utilize solid fossil fuels more efficiently and to use renewable fuels more extensively is becoming urgent. It is also essential that these fuels be used in a manner which minimizes any potential contribution to environmental pollution. As supplies of oil and gas are depleted and the future availability of the world's oil supply becomes increasingly questionable, the use of coal and other solid fuel reserves will become increasingly important. Solid fuels, however, often contain larger amounts of impurities than liquid or gaseous fuels. The combustion of these impurities along with the solid fuels results in the release of more pollutants to the environment than would occur due to the combustion of alternative liquid or gaseous fossil fuels.

The use of solid fuels such as coal remains an attractive alternative because of the large reserves of coal available and the relatively low cost of coal. However, the use of coal presents obvious disadvantages. Among these are the greater degree of pollution resulting from such use and the necessary limitation to stationary applications only. These disadvantages to the use of coal have spurred interest in the development of technology to convert solid fuel sources such as coal, tar sands, and oil shale to liquid and gaseous fuels.

The basic processes which underlie the conversion of solid fuels into gaseous and liquid fuels were known well back into the nineteenth century. During World War II, Germany relied heavily on gasification plants—plants for the conversion of solid and liquid fuel sources into gaseous fuels—for much of its energy needs. Today, a plant based on fundamentally similar processes operates in South Africa. Recently, large-scale gasification plants have been constructed in the U.S. that operate to produce a wide variety of materials.

The fundamental chemical and physical processes that form the basis for the conversion of solid fuel sources into liquid or gaseous fuels, although complex, have been studied extensively and are reasonably well-characterized. These processes and their application in commercial-scale projects has been reviewed in publications such as *An Introduction to Coal Technology*, by N. Berkowitz (Academic Press, New York, 1979), which is incorporated here by reference as is set forth in the text.

Although coal reserves are plentiful and relatively low in cost in comparison to other fossil fuels, the costs of converting solid fuel sources into gaseous fuel products are high. Consequently, fuel gas produced synthetically has a cost per Btu of energy that is greater than the cost of other naturally-occurring fossil fuels such as natural gas and oil.

The current state of development of gasification technology is directed primarily toward producing pipeline-quality fuel gases, such as synthetic natural gas (SNG), that have a Btu content comparable to naturally-occurring gaseous fuels (approximately 950 Btu per cubic foot). Economies of scale dictate the size at which these plants must operate to produce fuel gas at costs that are competitive with the costs of naturally-occurring liquid and gaseous fossil fuels. In some cases, the costs of gasification facilities and their operation are subsidized by governments. This is often a necessity due to the large capital expenditures required for plant construction. Without such subsidies, in many cases, the economies of scale necessary to render synthetic gas production competitive with fossil fuels could not be attained. Environmental concerns over the construction and operation of such large plants also adds significantly to these costs.

A number of processes have been developed which attempt to address some of the concerns expressed above concerning coal gasification. For example, U.S. Pat. No. 4,137,052 to du Pont discloses an apparatus and system for producing a coal gas of medium energy content (300–500 Btu per cubic foot) from a mixture of coal, air and water. The du Pont apparatus and system uses a series of retort reactors to produce a fuel gas mixture that is relatively high in methane and other hydrocarbons. Reaction temperatures in the retorts are attained by burning a portion of the product fuel gas stream in burners situated within an annular wall structure.

U.S. Pat. No. 4,177,120 to Zenty discloses a process for gasification of carbonaceous material in which carbon dioxide is converted to carbon monoxide by subjecting the carbon dioxide to solar radiation in an oxygen-free environment. The primary use of solar radiation in this process is to achieve a photodissociation of the carbon dioxide which results in reduction of the carbon dioxide to carbon monoxide by carbon present in the reactor. When the carbon dioxide is irradiated in the presence of other carbonaceous materials such as coal, the resulting product gas mixtures contains not only carbon monoxide but also methane and other hydrocarbons. The fuel gas produced by this process has a relatively high Btu content.

U.S. Pat. No. 4,229,184 to Gregg discloses an apparatus and method for gasifying coal and other carbonaceous material by using focused solar radiation. In this process, solar radiation is collected and focused by a set of primary and secondary mirrors into a reaction chamber, mounted on top of a tower, onto a moving or fluidized bed of carbonaceous material such as coal. The primary purpose of irradiation of the coal bed is to raise the temperature of the reactor so that pyrolysis of the coal occurs. In pyrolysis, volatiles are driven out of the coal, leaving essentially solid carbon or char. The resulting char then participates in subsequent reactions within the chamber, along with the volatiles driven off during pyrolysis. Next, steam is passed through the bed of carbonaceous material in the reaction chamber, producing a fuel gas mixture containing primarily carbon monoxide and hydrogen.

U.S. Pat. No. 4,415,339 to Aiman et al. discloses a gasification reactor in which coal or other carbonaceous material is converted into a hydrocarbon-free gas mixture through recycling of gases produced through pyrolysis of the carbonaceous material. In the Aiman reactor, solar radiation acts to pyrolyze the coal feed, creating char and pyrolysis gases. The pyrolysis gases are withdrawn from the reaction zone within the reactor, mixed with reactive gases such as steam, carbon dioxide, hydrogen, and methane and passed back into the reaction chamber where hydrocarbons present in the gas mixture are steam reformed into primarily carbon monoxide and hydrogen gases. Solar energy is used to provide the energy necessary for the reformation and gasification processes.

SUMMARY OF THE INVENTION

The present invention provides a method for converting solid organic fuels, most particularly coals, into high temperature gases that can easily be transformed into useful energy. This method employs a substantially closed reactor, referred to as a gasifier, having an internal reaction chamber or cavity made of materials that can tolerate the presence of oxygen at high temperatures, that possess low thermal mass, that limit or restrict the passage of heat, that function as almost perfect black bodies at high temperatures, and that are resistant to the abrasive effects of the solid fuels.

The method of the present invention produces a fuel gas, relatively free of potentially polluting impurities, that is used without further processing to produce useful energy. This fuel gas mixture can be used in conventional gas-fueled boilers or other energy conversion systems designed to utilize low-energy fuel gases. The gasifier, coupled with a gas boiler or other energy conversion device, forms a system that can compete economically with other energy conversion processes using solid and liquid fossil fuels. Furthermore, impurities originally present in the solid fuel mixture are chemically converted and collected along with a residue of inert matter, also referred to as ash, remaining from the solid organic fuels in the gasifier. Thus, the method of the present invention can be practiced to provide fuel gas for an energy conversion system which can operate with minimal harmful environmental effects.

In the method of the present invention, solid organic materials such as coal are induced to react with oxygen and water in a controlled manner by exposure to an intense radiation field which activates, or elevates the energy level of, the exposed surfaces of the solid materials. The activated surfaces of the solid fuels are better able to react with oxygen, carbon dioxide, and water in a manner that ultimately produces a fuel gas with an energy value between 180 and 300 Btu per cubic foot, 200 Btu per cubic foot is typical or average, of which about half is in the form of internal energy, or enthalpy, and half is in the heat of combustion. The energy value of the gas produced by this method should be compared with the 950 Btu per cubic foot energy content of pipeline-quality synthetic natural gas.

The present invention is not intended to produce a substitute for natural gas, or a gas suitable for transmission in a pipeline. Since the present invention will convert approximately half of the chemical energy of the solid fuel into the enthalpy of the fuel gas produced by the process, economical long distance transport of the gas would be impossible due to the inevitable loss of half of the energy content of the converted solid fuel.

In the practice of the present invention and in contrast with other gasification processes, the surfaces of the solid organic materials are activated by exposure to a field of radiant infrared energy such that these surfaces react rapidly with oxygen, carbon dioxide, and water. Consequently, the gasification process rapidly converts the air and water, through reaction with the activated surfaces of the solid organic materials, into fuel gas within seconds.

The method of the present invention produces fuel gas substantially free of potentially polluting gaseous compounds of sulfur and nitrogen by introducing calcium oxide or other oxides suitable basic oxides into the reactor with the solid feed. Under the conditions present in the reactor, sulfur and nitrogen react with the calcium to produce solid salts which are removed along with the inert residue from the solid organic fuel materials.

The present invention can be practiced with solid feeds other than coal, provided that these solid feeds have an appreciable organic content. A wide variety of materials such as organic wastes, municipal wastes, and biomass would be suitable. It is also possible to use a mixed feed comprising any or all of the above listed solid feed materials. The conditions under which the method of the present invention is practiced would be dependent upon the composition of the feed material in total organic content and moisture content.

Since the method of the present invention can be practiced with such a wide variety of feed materials, and, unlike most modern gasification technologies, can be economically practiced on a relatively small scale, a number of practical embodiments are possible. The present invention can be practiced utilizing a mixed feed consisting of a portion of coal, with the remainder of the feed being essentially organic waste materials such as hospital wastes or municipal wastes. With such a feed, a facility such as a hospital, a small manufacturing concern, or a shopping mall could practice the present invention with a relatively small-scale gasifier in a system directly linked to a conventional gas boiler or similar device.

Such an embodiment would provide a number of advantages over a conventional heat or power generation system for such a facility. Economic advantages result from the use of an inexpensive fuel such as coal or readily available wastes. Further advantages result from a method which not only produces fuel gas for direct use in energy conversion but also processes solid organic waste, eliminating the need for costly waste disposal or treatment. This also is done in a manner which minimizes impact on the environment. The actual composition of the fuel mixture fed into the gasifier in the practice of the present invention varies depending on the location and the nature of the facility in which the invention is practiced.

The improved method produces a residue within the reactor which is essentially chemically inert, as the operating temperature of the reactor is sufficient to melt most inorganic solids. These materials will form n inert, glass-like residue upon cooling. If anthracite coal is used to fuel the reactor, the residue or ash is composed of materials that melt at very high temperatures, and it will be more efficient to remove the residue from the gasifier as solid particles.

Accordingly, it is an object of the present invention to provide an improved method of converting solid organic materials, including coals and other solid fuels as well as other types of carbonaceous materials, including organic wastes, into a high temperature, relatively low-Btu, fuel gas, comprised of carbon monoxide and hydrogen gases, which is capable of being used, without further processing, to produce useful energy. It is a related object of the present invention to be able to practice this method on a scale which is appropriate for single, self-contained facilities at economies that compare favorably with conventional methods using solid and liquid fossil fuels.

It is also an object of the present invention to significantly reduce the risk of environmental pollution associated with the practice of the invention by removing substantially all of the sulfur and nitrogen contaminating the solid organic material as part of the conversion process.

These and other objects, advantages, and benefits of the present invention will become apparent from the following description of the preferred embodiment of the invention, described in conjunction with the accompanying drawings.

DETAILED DESCRIPTION OF THE INVENTION

Figure 1:
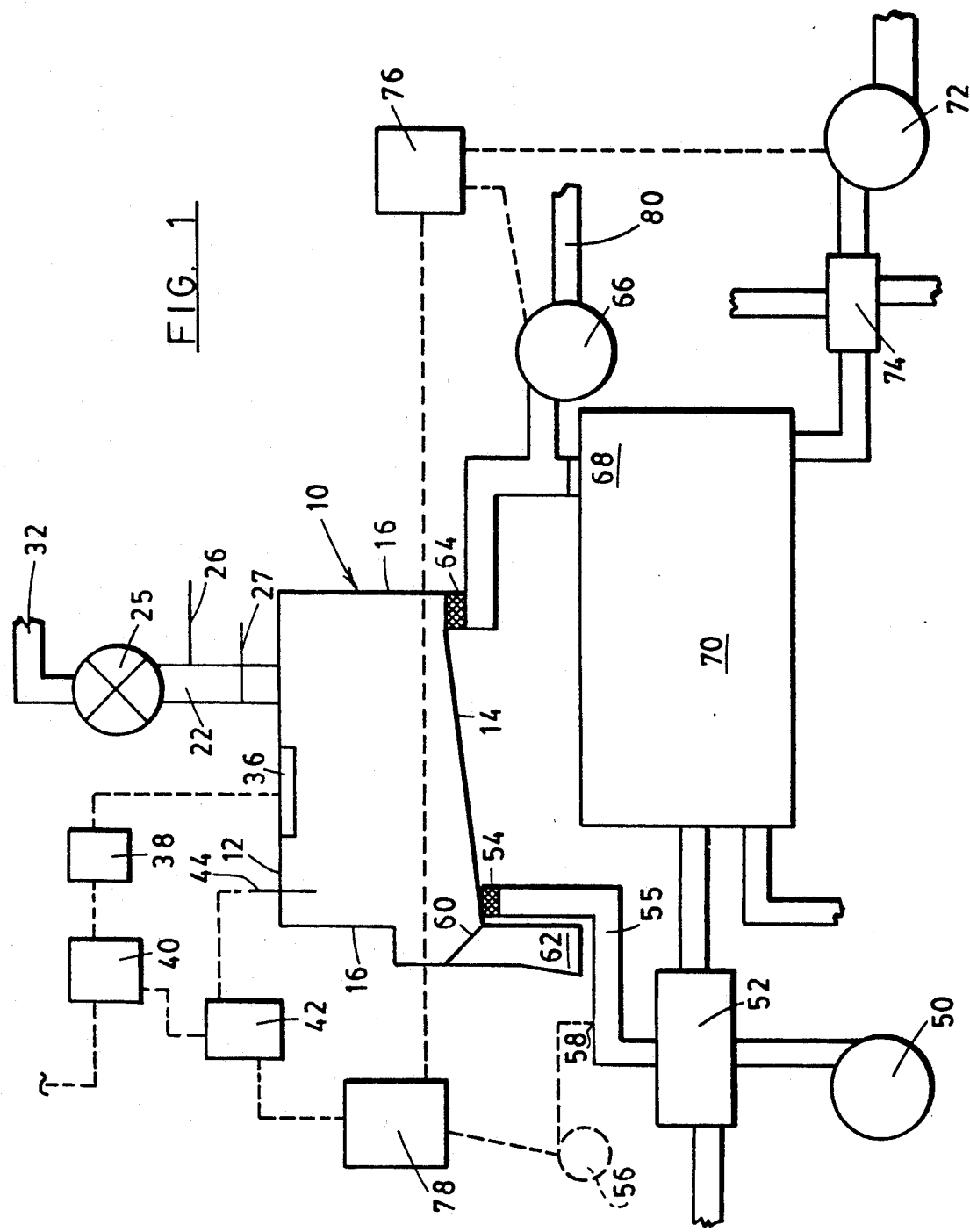
FIG. 1 is a schematic view of the layout of a gasifier system used to produce fuel gas from coal for supplying hot water or steam heat for an industrial or commercial facility such as a small hospital or factory.
Figure 2:
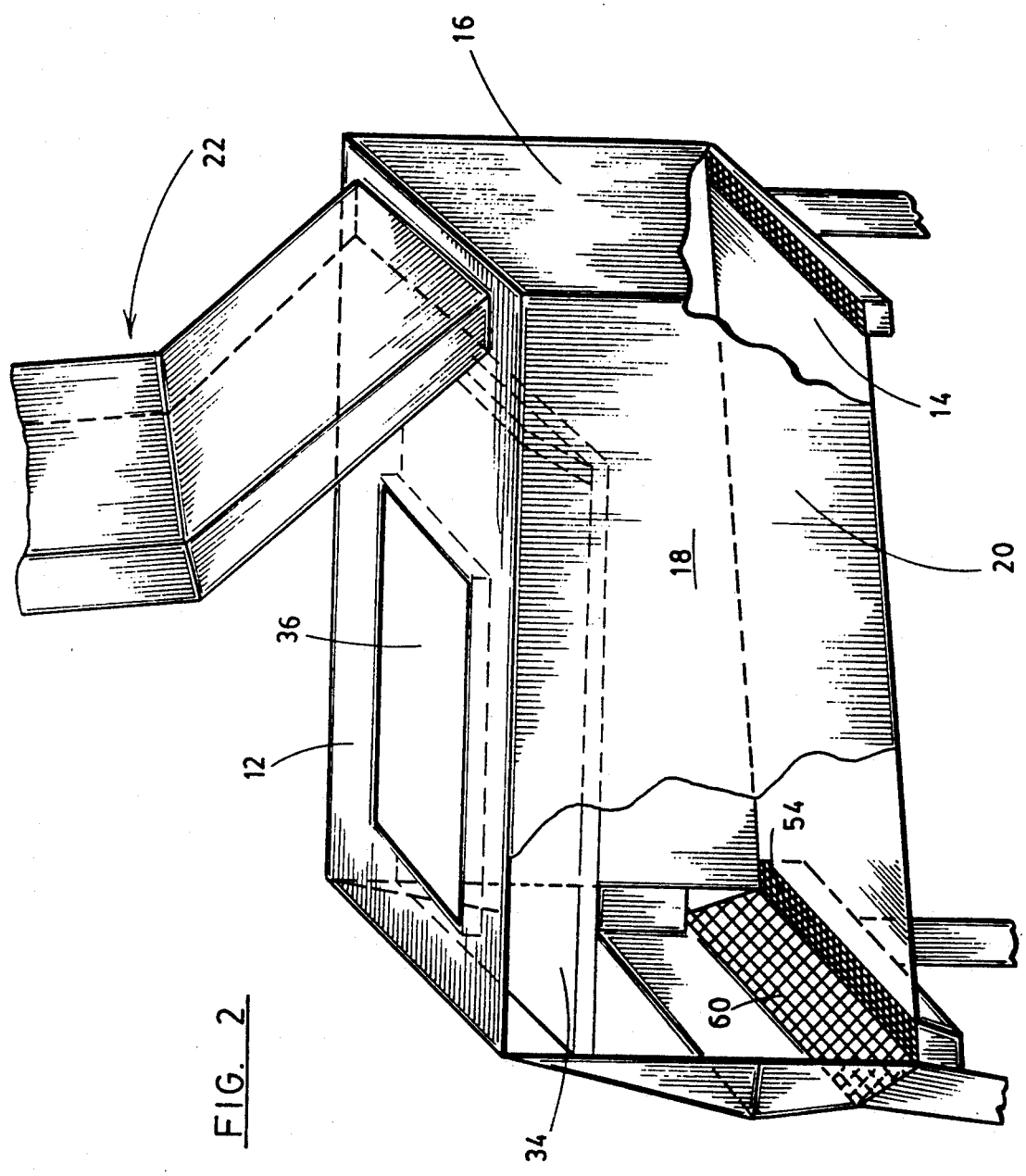
FIG. 2 is a cutaway perspective view of the reaction chamber showing the interior components and arrangement of the gasifier used in the system of FIG. 1.

FIG. 1 is a schematic view of the layout of a gasifier system used to produce fuel gas from coal for supplying hot water or steam heat for an industrial or commercial facility such as a small hospital or factory. FIG. 2 is a cutaway perspective view of the reaction chamber showing the interior components and arrangement of the gasifier used in the system of FIG. 1. In FIGS. 1 and 2, a gasifier 10 includes a top wall 12, a bottom wall 14, side walls 20, and end walls 16. The walls serve to define a substantially closed, internal cavity or reaction chamber 18 within the gasifier 10. The relative dimensions of the side walls 20 and the end walls 16 are chosen so that the overall configuration of the reaction chamber 18 is rectangular. In addition, the relative dimensions of the end walls 16 are selected so that the bottom wall 14 has a downward slope from one end wall of the reaction chamber to the other to facilitate a gravity feed of fuel material within the reaction chamber.

The walls of the gasifier 10 are constructed of fibrous ceramic materials or other suitable materials which are tolerant to the anticipated temperatures in the reactor, have low thermal mass, resist the transmission of energy, are tolerant to rapid temperature transients, and have high radiant emissivities. Materials ma be installed in layers with different materials in each layer. Steel or other such materials are used as an outer reinforcement for the fibrous ceramic materials and for structural strength.

The thicknesses of the walls are chosen to minimize energy loss. The particular materials used to construct the walls and the thicknesses of the walls are determined by the particular operating temperature selected for the reactor. For example, if the maximum operating temperature in the chamber is to be 1400° C., the materials forming the chamber should be suitable for temperatures up to 1500° C. or more. With these temperatures, the walls should be at least six inches thick so that the outer shell temperature of the reactor 10 will be sufficiently low so as not to constitute a health or safety hazard, and to reduce energy losses from the reactor. Fibrous ceramic materials that may be used for this purpose include those marketed by the Carborundum Company of Niagara Falls, N.Y., under the trade designation "Fiberfax."

The interior walls of the gasifier 10 are lined with a material chosen to resist the abrasive forces of the solid fuels that may be processed in the gasifier. Materials that may be suitable for this purpose include the porous ceramics marketed by HiTech Ceramics of Alfred, New York, under the trade designation "Udicell."

The gasifier 10 may be used to process a variety of different types of solid fuels. These materials can include anthracite coal, bituminous coal, peat, solid wastes of all kinds, and biomass materials, as well as mixtures proportioned as discussed below. The solid waste materials may be in a variety of assorted shapes and sizes. The materials need not be pre-treated. They can be processed as they are received from their sources except the materials may have to be roughly shredded mechanically or reduced to a size and shape that can be readily introduced into the reactor. This can be accomplished by a conventional, dedicated mechanical shredder, not shown.

The solid materials are introduced into the reaction chamber 18 by a feed chute 22. The feed chute passes through the top wall 12 of the gasifier at an angle and is long enough to prevent energy loss from the gasifier 10. The opening of the feed chute 22 into the reaction chamber 18 is disposed toward that end of reaction chamber from which the bottom wall 14 slopes downward. The walls of the feed chute are constructed of the same fibrous ceramic material as used for the walls and are lined with the same abrasion-resistant materials used to line the reaction chamber 18.

Conventional steel knife valves 26 and 27 are mounted within the feed chute 22 and are used to control the feeding of solid waste materials into the reaction chamber 18. An example of such a valve is the "Slide Gate" marketed by William W. Meyer & Son, Inc. of Skokie, Ill. A rotary valve 25 is included to limit the introduction of air into the reaction chamber 18 and to control the gasification process. An example of such a rotary valve is the "Roto-Flo" valve also marketed by William W. Meyer & Sons, Inc.

The solid fuel materials to be gasified are stored in a conventional storage container, not shown, and may be loaded into the feed chute 22 by a conventional conveyor 32, such as a screw feeder. The conveyor 32 is activated to fill the compartment of the rotary valve 25. The rotary valve is rotated 180°, dumping the solid fuel onto the lower knife valve 27. The upper knife valve 26 is closed, and the lower knife valve 27 is opened, dumping the solid fuel directly into the chamber 18. The downward slope of the lower wall 14 results in a general gravity flow of the solid feed away from the end of the reaction chamber 18 into which the feed chute 22 opens. The lower knife valve 27 is closed and the upper knife valve 26 opened to ready the system for further feeding of solid fuel.

A plurality of conventional radiant heaters 36, such as electrical resistance heaters, are mounted in the top wall 12 of the gasifier 10. A panel upon which such electrical resistance heaters are mounted is shown in FIGS. 1 and 2. Other arrangements of the heaters may also be utilized. The particular orientation of the heaters is not critical to the functioning of the gasifier. The size and number of the heaters 36 is determined by the size and shape of the gasifier 10 and the desired processing rate of feed material, as well as the particular kind of heater used. In this regard, the heaters 36 must, however, generate sufficient energy to raise the temperature of the reaction chamber 18 so that the inner walls of the reaction chamber are maintained at a high enough energy level to create, through black body emission, a field of radiant energy capable of activating the surfaces of the solid fuel materials.

The size of the gasifier 10, its wall thickness, the size of the reaction chamber 18, and the particular ceramic materials used for construction of the gasifier 10 will dictate the energy needed to maintain the reactor at any given temperature. Ultimately, the choice of heaters 36 is based on economic considerations and the operating temperatures required for the particular solid fuel materials being processed. Specifically, however, the heaters 36 need to have the capacity to be able to heat the reaction chamber 18 to a temperature of approximately 1250° C. Heaters having this capacity include those models marketed by the Kanthal Corp. of Bethel, Conn. under the trade designation "Superthal."

Electrical current is supplied to the heaters 36 via a conventional power controller 40 and a conventional transformer 38. The amount of current and the voltage are controlled to maintain a preselected temperature in the reaction chamber 18. Temperature may be measured in the reaction chamber by a conventional temperature-measuring device 44 such as a thermocouple or, alternatively, by conventional infra-red devices. The signal from the temperature measuring device 44 is directed to a conventional temperature controller 42 which interprets the information and provides an appropriate signal to the power controller 40.

Electrical current, as directed by the power controller 40, is supplied to the heaters 36 via the transformer 38. The transformer is selected to provide a voltage to suit the characteristics of the particular heaters used and the particular wiring configuration. Most radiant resistance heaters are low resistance, high current heaters. If connected in parallel, such heaters use voltages between 10 and 20 volts and currents between 150 and 275 amperes to achieve the above noted temperature.

Electrically powered resistance heaters produce heat by resistive effects which accompany the passage of electrical current through elements within the heaters. The amount of electrical current flow, the length and thickness of the elements, and the properties of the materials of which the elements are composed, in particular the resistivity, determine the amount and the characteristics of the energy produced.

At relatively low temperatures, below 800° C., the energy is transferred from these heaters to the surrounding environment via a convection mechanism, that is, through collisions between gas molecules. At higher temperatures, elements within the heaters radiate energy as light and approach the behavior of perfect black body radiators.

The theory of black body radiators is well known. The energy radiated is governed by the Stephan-Boltzmann equation $$M = cT^4$$

where M is the power of the energy radiated, c is Stephan's constant, and T is the absolute temperature. The spectral distribution of the radiation is given by Planck's law $$m = c/(L^5(exp(K/LT) - 1))$$

where c and K are constants, L is the wavelength of the radiation, T is the absolute temperature, and m is the power radiated per unit area at the wavelength L. The maximum monochromatic emissivity is given by Wien's law $$L \times T = W$$

where L is the wavelength at which the maximum energy is radiated, T is the absolute temperature of the radiating object, and W is a constant.

As is apparent from the Stephan-Boltzmann equation, where the power of the radiated energy is proportional to the fourth power of the absolute temperature, the power of the radiated energy increases rapidly with temperature. Once temperatures of about 1100° C. are reached, energy transfer occurs more through emission of radiant energy than through convection processes (collisions). Radiant energy transfer is very fast since the energy is transmitted at the speed of light and occurs between any two objects visible to each other. In contrast, energy transfer through inelastic collisions is much slower, dependent on the velocity of individual molecules and the frequency of collisions between the molecules.

At temperatures in the range of approximately 1100° C. to approximately 1500° C., the walls of the reaction chamber 18 can radiate light energy with n efficiency of about ninety-three percent. This means that 93% of the energy absorbed by the material in the interior walls of the reaction chamber is re-emitted as radiant energy. In comparison, a perfect black body radiator would re-emit, as radiant energy, 100% of the energy it had absorbed by whatever mechanism. While it is impossible for any material to function as a perfect black body radiator, the fibrous ceramic materials disclosed above, operating at 93% efficiency, come nearly as close a is practically possible today.

Thus, at the temperatures discussed above, an intense radiation field, sustained by emissions from the internal walls, permeates the reaction chamber even when the heaters 36 are not operating continuously. This radiation field consists primarily of light with frequencies from the infra-red and near infra-red regions of the electromagnetic spectrum. The characteristics of the radiation field, in terms of the range of frequencies and relative intensities of those frequencies, are determined by the Stephan-Boltzmann, Planck, and Wien equations, described above, and thus are highly dependent on the temperature within the gasifier. The resulting radiation field, preferably, will have a density of approximately thirty or more watts per cubic centimeter.

A layer 34 of the materials used to line the reactor is installed to separate the heaters 36 from the reaction chamber 18. Thus, the solid fuels are contained within a substantially closed reaction chamber. The heaters radiatively heat the layer 34 of ceramic or other suitable material that can function as an almost perfect black-body radiator in the upper portion of the reaction chamber 18. Since this layer is relatively thin, 0.5 to 1.0 inch, the temperature of the wall will be greater than 1000° C., causing it to emit energy in the form of radiation. This layer can also be constructed of a material, such as silicon carbide, with a greater degree of thermal conductivity than most ceramics.

As the solid fuels are fed into the chamber 18, they are immediately introduced into this intense radiation field comprised of emissions from the internal walls of the reaction chamber. The surfaces of the solid fuel materials absorb the infra-red radiation, thus increasing the energy of, i.e., activating, the surfaces of the solid fuel materials. Activation of the surfaces promotes the subsequent chemical reaction processes.

If the solid fuel is some form of coal, the activated surfaces of the coal react with oxygen in a highly exothermic reaction, producing carbon dioxide according to the reaction below:

$$^*C_{(s)} + O_{2(g)} \rightarrow CO_{2(g)} + \text{energy}$$

wherein $^*C_{(s)}$ represents an activated atom of carbon on the surface of the solid coal.

The activated surfaces of the solid coal react further in an endothermic process to reduce the carbon dioxide to carbon monoxide, producing two molecules of carbon monoxide for each molecule of carbon dioxide reduced according to the reaction below:

$$^*C_{(s)} + CO_{2(g)} + \text{energy} \rightarrow 2\, CO_{(g)}.$$

The activated surfaces of coal also react in an endothermic reaction with water at the temperature of the gasifier to produce hydrogen gas and carbon monoxide according to the reaction below:

$$^*C_{(s)} + H_2O_{(g)} + \text{energy} \rightarrow H_{2(g)} + CO_{(g)}.$$

These three reactions taken together in the appropriate ratio convert coal to a low energy fuel gas while using about half of the energy in the coal to maintain the temperature of the gasifier.

In partially combusting the coal and converting the remainder to low-Btu fuel gas, the gasifier, in a separate step and in a physically separate device, acts as a pre-reactor. Instead of directly burning the coal and using the resulting energy to produce steam, as would be done in a conventional coal-fired boiler, the gasifier combusts a portion of the coal and converts the remainder to a high-temperature fuel gas which can then be utilized in a gas-fired boiler that functions, at least partially as a heat exchanger. The gasifier, rather than the boiler, can be designed to handle the extreme conditions accompanying the combustion of coal. The gasifier can also more efficiently be designed to treat the potentially polluting by-products of coal combustion. Add to this the additional capacity to utilize a mixture of solid fuel feeds, and the advantages of the gasifier/boiler system design become obvious.

If the solid fuel is solid organic waste or biomass materials, the radiation field photolytically induces the decomposition of the organic materials present in the waste or biomass into carbon and hydrogen. The solid carbon so produced will absorb energy from the radiation field and become activated, and reacts in the manner described above for coal.

The amount of oxygen and water introduced into the reaction chamber 18 is adjusted to suit the approximate amount of carbon and moisture in the solid fuel. Where the waste material or biomass introduced into the gasifier has a relatively high moisture content (>20%), very little water needs to be added to the reaction chamber. Moveover, if the solid fuel introduced into the reaction chamber is composed of a mixture of coal and biomass materials, there may be no need to add any additional water to the reactant mix, provided that the proportion of high-moisture biomass material to coal is adjusted accordingly.

Oxygen or oxygen-containing air is introduced into the reaction chamber 18 through a gas duct 55 that opens into the bottom of the reaction chamber. A gasifier air fan 50 blows the air through a heat exchanger 52, which uses waste heat from a boiler 70, into the gas duct 55. A porous ceramic plate 54 prevents solid residue in the reaction chamber from entering the gas duct 55. A pump 56 injects water into the gasduct through a spray nozzle 58. The air is at a temperature such that the water is vaporized and enters the gasifier as water vapor. Alternatively, steam from the boiler may be injected into the air duct 55.

When the air enters the reaction chamber 18 of the gasifier, it encounters the solid fuel which has been exposed to and activated by the intense radiation field. The solid fuel reacts with the oxygen in the air in a localized combustion reaction, releasing large amounts of energy. The inorganic residue, or ash, of the combusted solid fuel, if the residue remains in a solid form, passes through an ash grate 60. If the inorganic residue has a low melting point, as might be found with bituminous coal or solid organic wastes, the molten residue will drip through the ash grate 60 into an ash pit 62. If the inorganic residue has a high melting point and is collected as a solid, the ash pit 62 remains dry. If the inorganic residue is molten, the arrangement of the air ducts 55 is modified to prevent ash from dripping into the duct. Water may be provided in the ash pit 62 to cause the molten ash to solidify. The water in the ash pit will be cooled with cooling coils or other conventional cooling devices not shown.

The products of the combustion of the solid fuel contain a mixture of high temperature gases, essentially comprising carbon dioxide, water vapor, and nitrogen. The fan 50 forces these gases through the gasifier, and the action of a combustion fan 66 in the external fuel line 80 of the boiler 70 further draws the hot gases through a bed of surface-activated and unreacted solid fuel.

As the hot gases pass through the bed of solid fuel materials, the carbon dioxide present in the hot gas mixture is reduced by the surface-activated carbon, producing carbon monoxide, and the water vapor present also reacts with carbon, producing carbon monoxide and hydrogen gases. The energy released from the combustion of the solid fuel is used to drive these endothermic chemical processes. The final product gases that result exit the reaction chamber of the gasifier via a porous ceramic plate 64 which prevents solid fuel from leaving the gasifier. The gases leaving the gasifier are comprised almost solely of nitrogen, carbon dioxide, carbon monoxide, and hydrogen. Only small amounts of other gases may be present. The equivalent energy value of the fuel gas mixture leaving the gasifier is about 200 Btu per cubic foot.

The fuel gas mixture leaving the gasifier joins with the external fuel line 80 of the boiler 70. The two gas streams join at a burner 68 located in the wall of the boiler 70. The fan 66 blows air into the fuel gas line 80 to support combustion of the fuel gases in the boiler 70. A feed pump 72 supplies water to the boiler 70. A conventional heat-exchanger 74, using waste heat from the exhaust gases or other conventional sources, may preheat the water. The boiler 70 may produce steam or hot water. Operation of the boiler feed pump 72 and the fan 66 are controlled by a boiler controller 76. The operation of the boiler 70 and the gasifier 10 are coordinated with a conventional system controller 78 which insures that these two operate in a coordinated and consistent manner.

The preferred embodiment of the present invention has now been described. This preferred embodiment constitutes the best mode presently contemplated by the inventor for carrying out his invention. Because the invention may be copied without copying the precise details of the preferred embodiment, the following claims particularly point out and distinctly claim the subject matter which the inventor regards as his invention and wishes to protect.

I claim:

1. A method for converting solid fuel materials into a low energy fuel gas comprising carbon monoxide, carbon dioxide, hydrogen, and nitrogen with an average equivalent energy value of approximately 200 Btu per cubic foot, in a gasifier having a substantially closed internal reaction chamber, the reaction chamber being made of materials that can tolerate the presence of oxygen at high temperatures, that possess low thermal mass, that limit the passage of heat, that are resistant to the abrasive action of the solid fuel, and that function as almost perfect black bodies at high temperatures, and with the internal chamber having a plurality of controlled-access openings for introduction of solid fuel material, for introduction of air and water vapor, for removal of inert residues, and for removal of the fuel gas, the method comprising the steps of:

supplying energy to the interior of the reaction chamber so that the reaction chamber is at a high enough energy level, as indicated by temperatures in the range of about 1100°–1500° C., to cause the interior walls of the reaction chamber to emit black-body radiation;

generating an intense radiation field in the reaction chamber, comprising primarily infrared radiation, as a result of radiative emissions from the interior walls of the reaction chamber;

introducing the solid fuel materials into the reaction chamber of the gasifier through a first of the plurality of controlled-access openings to expose the solid fuel materials to the intense radiation field present so that absorption of the radiant energy activates the surface of the fuels for subsequent chemical reactions;

introducing oxygen and water vapor into the reaction chamber of the gasifier through a second of the plurality of controlled-access openings disposed in a position distant from the first of the plurality of controlled-access openings, causing local combustion of the solid fuel material, thereby resulting in the production of carbon dioxide and the release of energy;

forcing the gases present in the reaction chamber to pass over the surface-activated solid fuel material, allowing both the water vapor and the carbon dioxide gas to react with the surface-activated solid fuel material, thereby producing carbon monoxide and hydrogen gases; and withdrawing a fuel gas comprising carbon monoxide, carbon dioxide, and hydrogen from the gasifier through a third of the plurality of controlled-access openings disposed in a position distant from the second of the plurality of controlled-access openings.

2. The method of claim 1 comprising in addition a step of combusting the fuel gas withdrawn from the reaction chamber of the gasifier in a boiler or other energy conversion device and using both heat of combustion and internal energy of the gases to produce hot water or steam.

3. The method of claim 1 wherein the solid fuel material is anthracite coal; wherein the first of the plurality of controlled-access openings includes both a feed chute having an orientation relative to the gasifier and enough length to retain the radiant energy within the chute, and means to restrict the entry of air into the gasifier; wherein the second of the plurality of controlled-access openings is covered with a porous ceramic plate to prevent the coal from entering an air duct; wherein the third of the plurality of controlled-access openings is covered with a porous ceramic plate to allow the fuel gas to exit the gasifier while retaining the coal; wherein a fourth of the plurality of controlled-access openings is covered with a ceramic grate to allow inorganic residue or ash to exit the gasifier.

4. The method of claim 1 wherein the solid fuel material is bituminous coal; wherein th first of the plurality of controlled-access openings includes both a feed chute having an orientation relative to the gasifier and enough length to retain the radiant energy within the chute, and means to restrict the entry of air into the gasifier; wherein the second of the plurality of controlled-access openings is covered with a porous ceramic plate to prevent the coal from entering an air duct; wherein the third of the plurality of controlled-access openings is covered with a porous ceramic plate to allow the fuel gas to exit the gasifier while retaining the solid fuel materials; wherein a fourth of the plurality of controlled-access openings is covered with a ceramic grate to allow the inorganic residue or ash to exit the gasifier.

5. The method of claim 2 wherein the solid fuel material is comprised of solid wastes, peat or other organic material.

6. The method of claim 2 wherein the solid fuel material is a mixture comprised of coal, solid wastes, peat or other carbonaceous material.

7. The method of claim 1 wherein the method comprises in addition a step of heating the interior of the gasifier to a temperature in the range of around 1100° C. to around 1500° C. before the solid fuel material is introduced into the reaction chamber of the gasifier and maintaining that temperature in the reaction chamber during the conversion of the solid fuel material into fuel gas.

8. The method of claim 1 wherein the radiation field is predominantly infra-red radiation with a density of thirty or more watts per cubic centimeter.

9. The method of claim 1 wherein portions of the walls of the gasifier that define its reaction chamber are made of fibrous ceramics; and wherein the thickness of these walls is at least six inches so as to minimize energy losses.

10. The method of claim 3 wherein the radiation field is predominantly infra-red radiation with a density of thirty or more watts per cubic centimeter.

11. The method of claim 3 wherein portions of the walls of the gasifier that define its reaction chamber ar made of fibrous ceramics; and wherein the thickness of these walls is at least six inches so as to minimize energy losses.

12. The method of claim 4 wherein the improved method comprises in addition a step of heating the interior of the gasifier to a temperature in the range of around 1100° C. to around 1500° C. before the solid fuel material is introduced into the reaction chamber of the gasifier and maintaining that temperature in the reaction chamber during the conversion of the solid fuel material into fuel gas.

13. The method of claim 4 wherein portions of the walls of the gasifier that define its reaction chamber are made of fibrous ceramics; and wherein the thickness of these walls is at least six inches so as to minimize energy losses.

14. The improved method of claim 1 comprising in addition a step of removing inert residue from the reaction chamber through a fourth of the plurality of controlled-access openings.

* * * * *